US 8,769,786 B1
Jul. 8, 2014

(12) United States Patent
Alexander et al.

(54) TRIM AND FLAME ROBOT END EFFECTOR WITH OPTIONAL AUTOMATIC BLADE CHANGE FEATURE

(75) Inventors: Ryan Alexander, Marysville, OH (US); Lonnie Thompson, Delaware, OH (US); Rob Howells, Marysville, OH (US); Erik Aisel, Hilliard, OH (US); Darin Wells, Marysville, OH (US); Gary Flavell, Harrison, OH (US); Chris Easton, Sylvania, OH (US); Diana Bush, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 762 days.

(21) Appl. No.: 12/410,054

(22) Filed: Mar. 24, 2009

(51) Int. Cl.
*B23P 23/02* (2006.01)

(52) U.S. Cl.
USPC ............. 29/50; 29/34 R; 29/33 A; 228/902; 901/41; 483/16; 483/901

(58) Field of Classification Search
USPC .......... 29/50, 34 R, 564, 35.5, 39, 56.5, 33 A, 29/33 B, 33 J, 33 K; 228/902; 901/41, 42; 483/16, 39–40, 56–57, 901; 409/233
See application file for complete search history.

(56) References Cited

U.S. PATENT DOCUMENTS

| 931,327 | A | * | 8/1909 | Manzel | 279/93 |
|---|---|---|---|---|---|
| 3,259,958 | A | * | 7/1966 | Lemelson | 29/40 |
| 3,691,899 | A | * | 9/1972 | Antonietto et al. | 29/40 |
| 4,741,078 | A | | 5/1988 | Kimura | |
| 4,787,786 | A | * | 11/1988 | Freud et al. | 409/180 |
| 4,865,093 | A | * | 9/1989 | Ford et al. | 144/144.1 |
| 5,791,032 | A | | 8/1998 | Spencer et al. | |
| 5,931,071 | A | * | 8/1999 | Mori | 83/74 |
| 5,974,643 | A | | 11/1999 | Hays et al. | |
| 6,332,861 | B1 | | 12/2001 | Otsuka et al. | |
| 6,451,245 | B2 | * | 9/2002 | Pisot et al. | 266/77 |
| 6,514,018 | B2 | | 2/2003 | Martinez et al. | |
| 6,860,683 | B2 | * | 3/2005 | Choi | 409/233 |
| 6,929,436 | B2 | * | 8/2005 | Shannon | 409/178 |
| 7,311,482 | B2 | * | 12/2007 | Sugita et al. | 409/231 |
| 2005/0196247 | A1 | * | 9/2005 | Dawidziak et al. | 409/233 |
| 2007/0191198 | A1 | * | 8/2007 | Distel | 483/16 |
| 2007/0201958 | A1 | * | 8/2007 | van Houten | 407/53 |
| 2008/0053975 | A1 | * | 3/2008 | Yamazaki et al. | 219/121.78 |

FOREIGN PATENT DOCUMENTS

JP  63-120045 A * 5/1988

* cited by examiner

*Primary Examiner* — Erica E Cadugan
(74) *Attorney, Agent, or Firm* — Standley Law Group LLP

(57) ABSTRACT

A combination trimming/flame treatment end effector adapted for mounting to the end of a robotic arm. A trimming blade extends from a main body portion of the end effector for performing a trimming operation. The trimming blade may be mounted in an exchangeable cartridge to facilitate blade changing. Also extending from the main body portion is a flame treatment element for performing a flame treatment operation. The flame treatment element generally comprises a torch or burner. Because both the trimming blade and the flame treatment element are part of the same end effector, the robot simply manipulates the end effector such that the desired one of the trimming blade or the flame treatment element is properly positioned for use. As such, a tooling change can be avoided. While not restricted thereto, it is contemplated that an end effector of the present invention may be used to process vehicle bumper fascias.

20 Claims, 6 Drawing Sheets

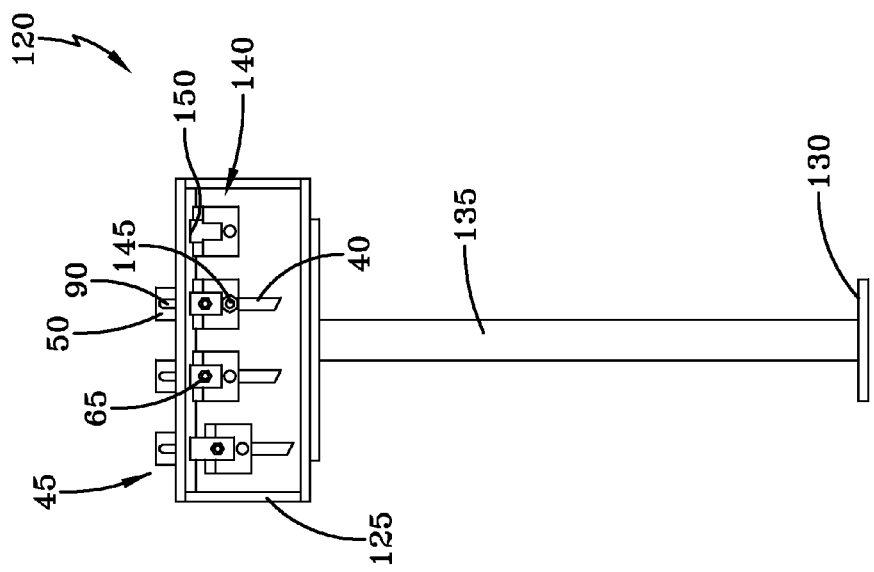
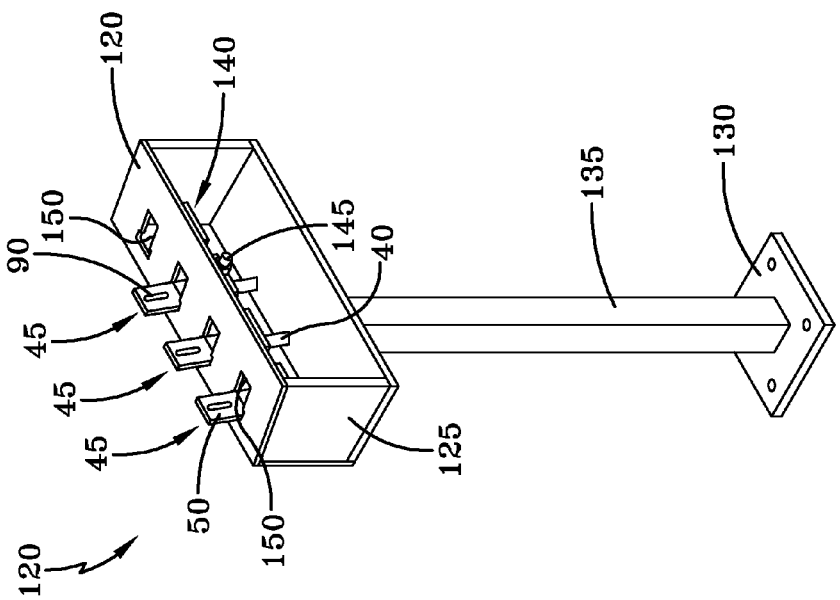

TRIM AND FLAME ROBOT END EFFECTOR WITH OPTIONAL AUTOMATIC BLADE CHANGE FEATURE

BACKGROUND OF THE INVENTIVE FIELD

The present invention is directed to a robot end effector for performing post-molding operations on articles such as vehicle bumper fascias. More particularly, the present invention is directed to a single robot end effector that is capable of both trimming and flame treating such articles.

It would be well understood by one skilled in the art that molds for making plastic parts such as bumper fascias typically include one or more gates through which molten plastic material is injected during the molding process. Plastic mold gates can be of various design. A gate design commonly employed in larger parts such as bumper fascias is a film or ribbon gate design, wherein a long, thin gate, is located along an edge of the part.

For aesthetic and/or other reasons, molding gates must typically be removed from molded parts after molding. Gate removal is commonly accomplished, at least with softer plastic materials such as those used in bumper fascia manufacturing, by trimming with a knife. While the gate trimming process may be performed manually, the use of automated or robotic gate trimming devices is becoming more common.

In addition to gate removal, plastic parts such as bumper fascias often require the removal of flash, which typically occurs along a parting line between mold halves or between a mold half and a mold core. When the location of flash on a part will be visible, such as may be the case once a bumper fascia is installed to a vehicle, it must be ensured that the appearance of the flashed area is acceptable. Even when flash is not an issue, parting lines themselves may also present an unacceptable appearance—especially after receiving paint.

Further, when applicable such as in the case of bumper fascias, it must be ensured that the material of which the part is constructed will exhibit proper paint adhesion. As would be understood by one of skill in the art, the nature of some plastic materials, particularly the thermoplastic polyolefins such as the polypropylene blends commonly used to mold bumper fascias, can render it difficult to impart an acceptable appearance. The presence of flash and/or an unacceptable parting line may exacerbate such adhesion resistance to primers and/or paint adhesion.

Consequently, various processes have been developed to alleviate these problems. One such process is localized flame treatment. In a localized flame treatment process, a flame is passed over an area of previously trimmed flash, or may be used to remove areas of light flash in lieu of removal thereof with a knife or other trimming device. It may also be possible to enhance the appearance and/or adhesion to paint of a previously trimmed area of a molded part, such as a gate removal area.

Flame treatment may be accomplished manually or through use of automated equipment, such as a robot. In either case, known systems and methods have typically required the use of separate trimming and flame treatment devices. For example, in a manual operation, an operator is generally required to use a knife or similar device when trimming a gate and/or flash. Once trimming is complete, the operator is then required to put down the trimming device and pickup a flame treatment device, such as a portable torch. A similar requirement applies to automated or robotic flame treatment systems and methods wherein, for example, a robot is required to switch between trimming and flame treatment end-of-arm tooling (end effector) when switching between process steps.

While switching between trimming and flame treatment devices may not seem burdensome when considered over one or a small number of trimming/flame treatment processes, it can be easily understood how such a requirement is burdensome and time consuming when considered over hundreds of thousands of such processes. Therefore, it would be desirable to eliminate the need to switch between separate trimming and flame treatment devices when performing such aforementioned post-molding processes. The present invention is directed to a combination trimming/flame treatment device for use by a robot, which device and method of use eliminates the need to switch between separate trimming and flame treatment devices.

SUMMARY OF THE GENERAL INVENTIVE CONCEPT

A combination trimming/flame treatment device of the present invention is implemented as a robotic end effector. Consequently, such a device may be removably affixed to the end of a robotic arm by a number of means including, but not limited to, various fasteners or robotic tool changers. While not essential to the present invention, the use of a tool changer is preferred as it imparts a trimming/flame treatment processing system with increased flexibility.

A combination trimming/flame treatment device of the present invention generally includes a main body portion adapted for mounting to the end of a robotic arm or tool changer associated therewith. Extending from the main body portion is a trimming blade that can be used to trim gates and/or flash from a bumper fascia or other molded part as described above. In at least certain embodiments of the present invention, the trimming blade is mounted in an exchangeable cartridge that allows for a simple and efficient blade change when the trimming blade in use becomes dull or broken. Also extending from the main body portion is a flame treatment element for flame treating gates and/or flash of a molded part, as further described above. The flame treatment element generally comprises a torch or burner and a supply line/conduit for supplying the burner with fuel. A shutoff valve or similar device may also be located on/in the end effector for controlling the supply of fuel to the burner, although such a device may also be located remotely.

Because both the trimming blade and the flame treatment element are part of the same end effector, an associated robot is not required to make a tooling change when switching from a trimming operation to a flame treatment operation. Rather, the robot simply manipulates the combination end effector such that the desired one of the trimming blade or the flame treatment element is properly positioned for use. As such, a trimming and flame treatment process can be performed more efficiently when using a combination trimming/flame treatment device of the present invention, and the overall cycle time required to produce a given molded part may be reduced.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 6a-6b show perspective and rear elevation views, respectively, of an optional trimming blade changing station of the present invention.

DETAILED DESCRIPTION OF EXEMPLARY EMBODIMENT(S)

Figure 1:
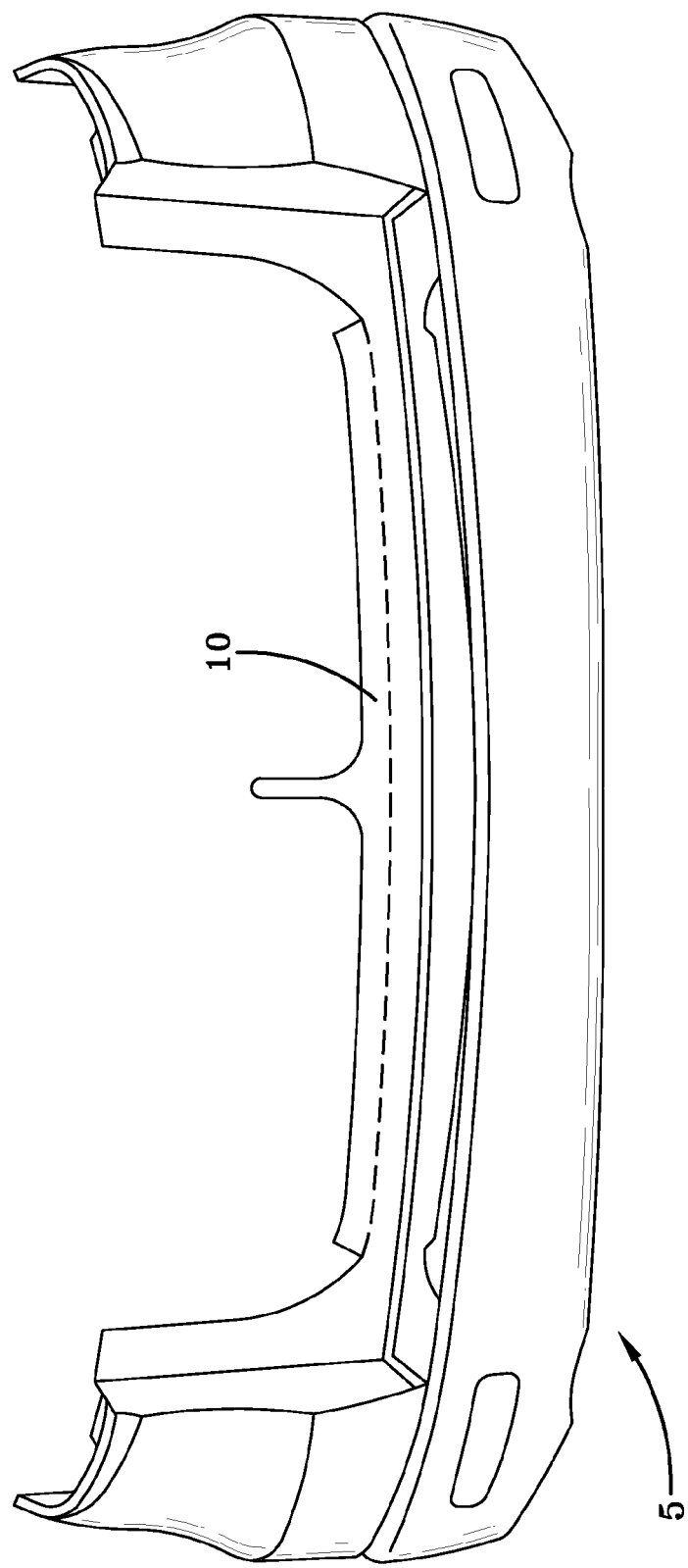
FIG. 1 is a front elevation view of one exemplary bumper fascia that may be trimmed and flame treated using a device and method of the present invention.
Figure 2:
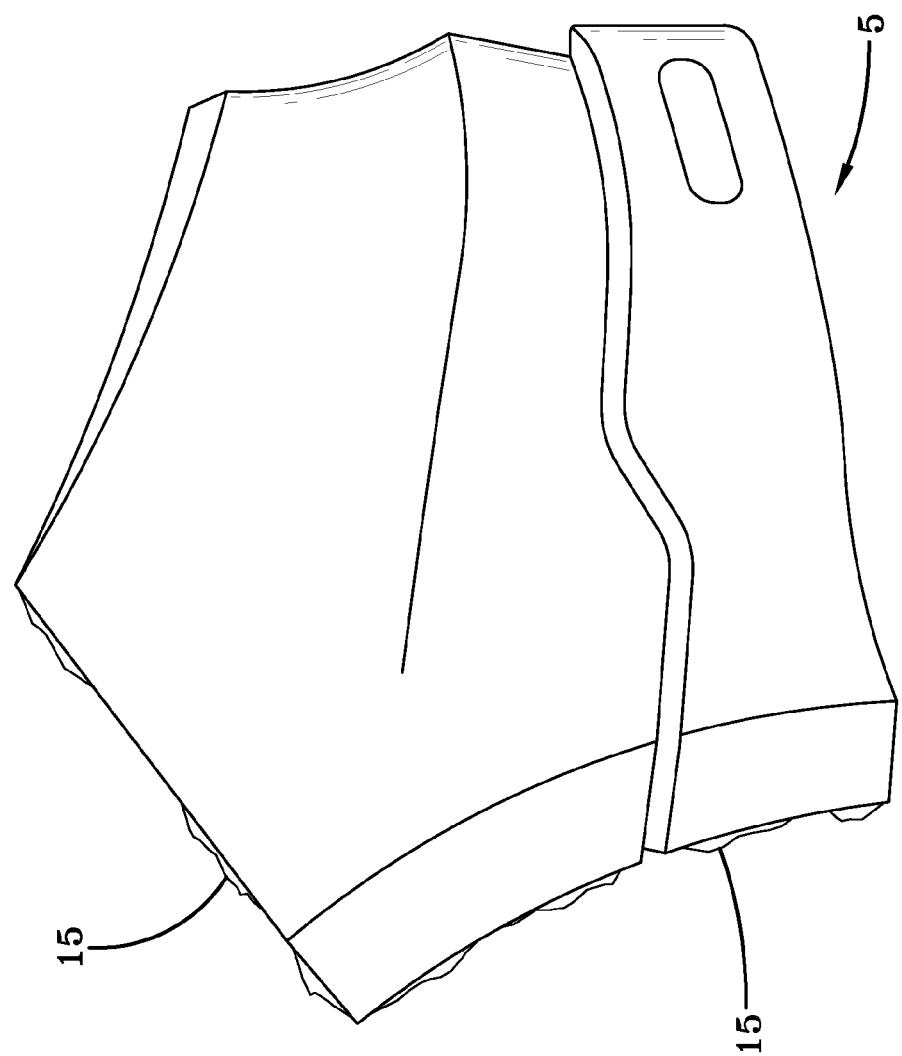
FIG. 2 is a side elevation view of the bumper fascia FIG. 1.

One exemplary embodiment of a bumper fascia 5 that may be processed by a device and method of the present invention is depicted in FIGS. 1-2. As shown in FIG. 1, the bumper fascia 5 includes an elongated (e.g., film or ribbon) gate 10 that must be removed therefrom prior to transfer of the bumper fascia to a coating (e.g., painting) process and, obviously, before its ultimate installation to a vehicle. As illustrated in FIG. 2, the bumper fascia 5 also includes flash or an otherwise unacceptable seam along a parting line in its wheel well and quarter panel adjoining areas (as generally indicated by 15).

The gate 10 of the bumper fascia 5 is to be removed by trimming, typically with a knife blade. Subsequent to gate removal, the trimmed area may also be flame treated if flame treatment helps to improve its adhesion to an after-applied coating material, such as paint. Flash 15 or raised parting line material must typically also be removed. The flash 15 may be trimmed and flame treated as described with respect to the gate 10 or, in some cases, may be removed by flame treatment alone.

As previously discussed, removal of such a gate 10 and flash 15 and flame treatment of selected areas on a bumper fascia 5 may be commonly accomplished manually or automatically (i.e., robotically). In either case, however, this process has typically required the use of separate tools for each purpose. Particularly, a trimming device (e.g., knife) is used for the trimming operation, and a flame applicator (e.g., torch) is used for the flame treatment process. Because these are separate tools, a user or a robot is normally required to switch between tools at least once per each bumper fascia trimming/flame treatment operation.

Figure 3:
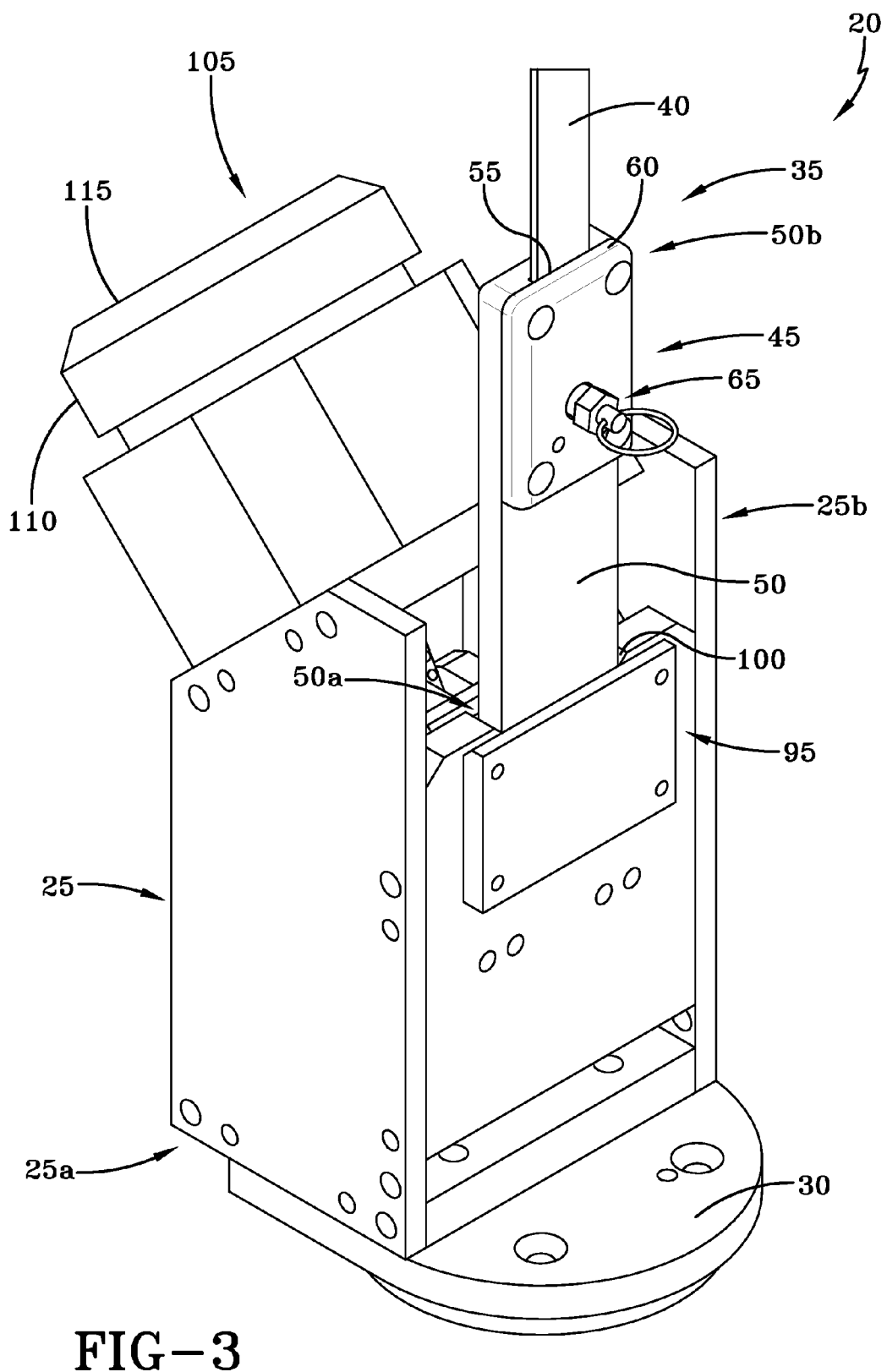
FIG. 3 is a perspective view of one exemplary embodiment of a combination trimming/flame treatment device of the present invention.
Figure 4:
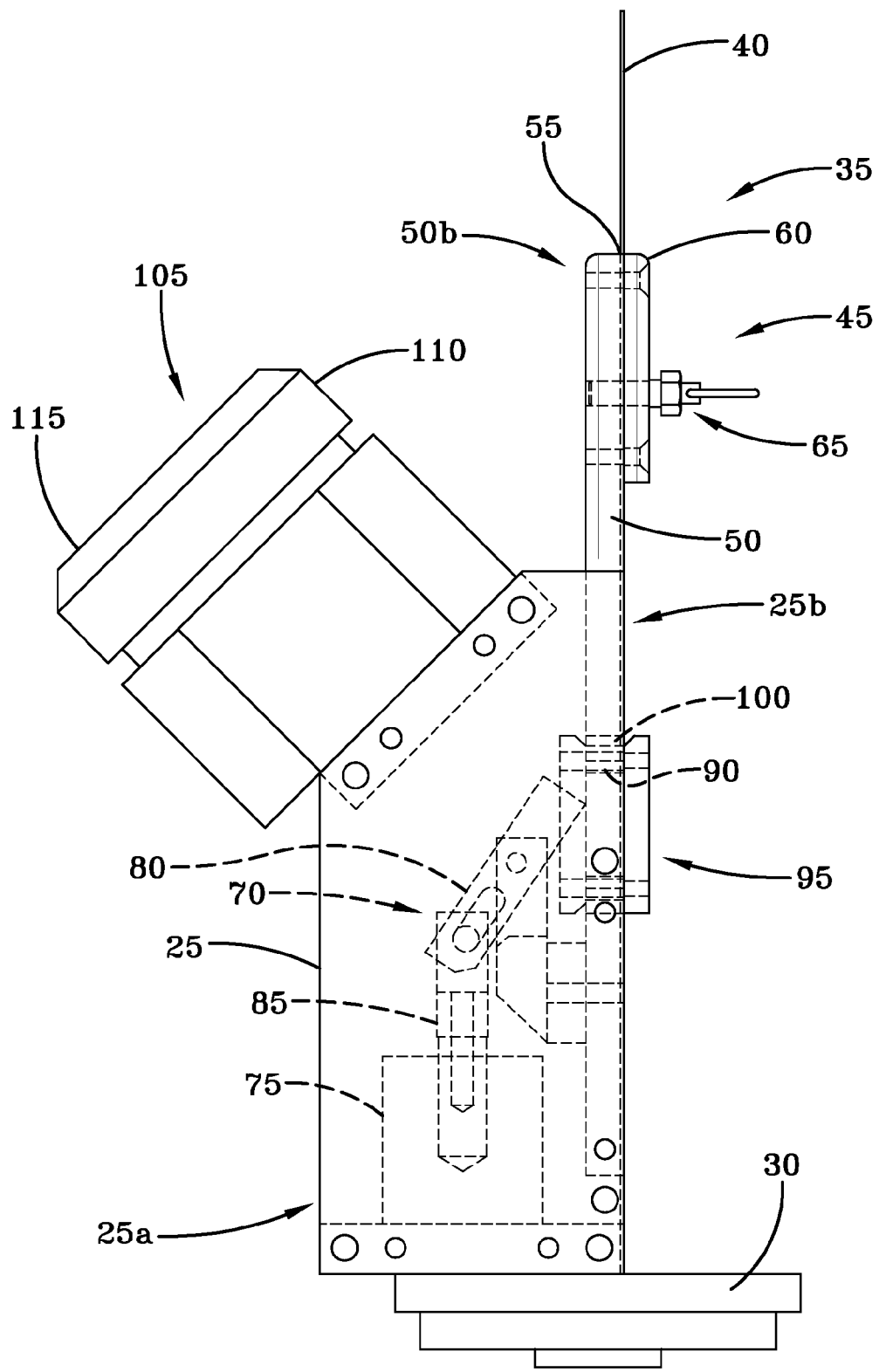
FIG. 4 is a side elevation view of the device of FIG. 3.
Figure 5:
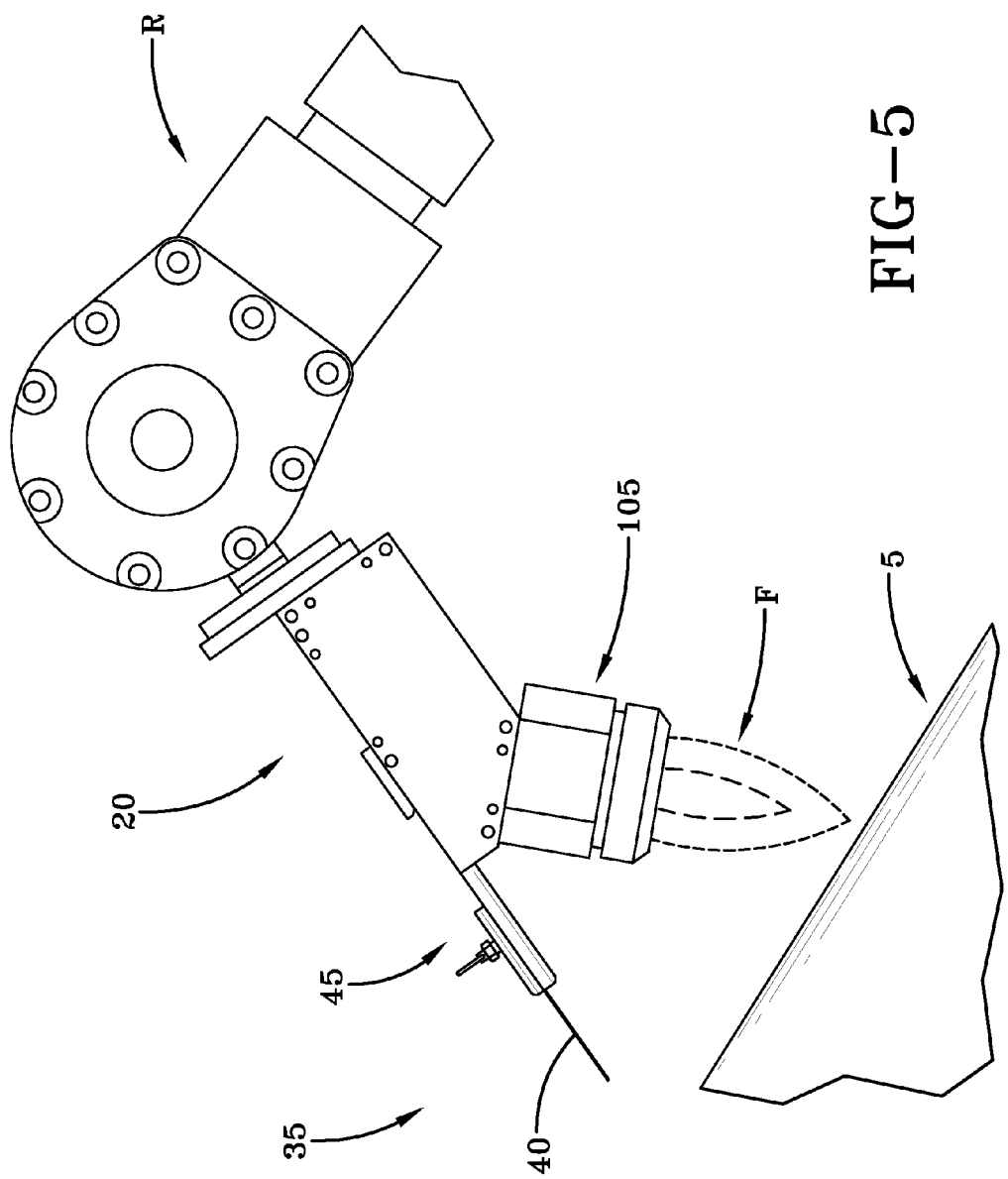
FIG. 5 depicts the device in FIGS. 3-4 in use on a robot.

One exemplary embodiment of a combination trimming/flame treatment robot end effector 20 (end effector) that eliminates the need to switch between trimming and flame treatment devices can be observed in FIGS. 3-5. As can be seen most clearly in FIGS. 3-4, the end effector 20 includes a main body portion 25 that is attached at a first end 25a to an end effector mounting plate 30 that is adapted to mount the end effector to a robot R (see FIG. 5). In an alternate embodiment of the present invention, one end of the main body portion itself may be adapted to mount the end effector to a robot, thereby eliminating the need for a separate mounting plate.

In the particular exemplary embodiment shown, the main body portion 25 is constructed from a number of individual plates so as to form a substantially hollow interior. When the main body portion 25 is constructed in this manner, the plates may be joined together by fasteners (as shown), by welding, etc. Alternatively, the main body portion 25 may be constructed as a unitary structure, such as by molding, casting or machining. It is contemplated that the main body portion 25 and/or the mounting plate 30 may be manufactured from various metals, composites or plastics but, in any event, said components must exhibit sufficient strength in use.

A trimming device 35 is shown to extend from near a second end 25b of the main body portion 25. The trimming device 35 includes a trimming blade 40 for trimming gates and/or flash from a bumper fascia or other molded part.

As illustrated, this particular embodiment of the trimming device 35 is provided as an exchangeable trimming blade cartridge 45 (exchangeable cartridge) so as to permit the simple, safe and efficient changing of a dull or broken trimming blade 40. The exchangeable cartridge 45 is shown to include a shank 50. A first end 50a of the shank 50 is received in a cartridge retention slot 100 of a cartridge retention assembly 95 of the main body portion 25. A second end 50b of the shank 50 is adapted to receive and retain the trimming blade 40. Exchangeable cartridges 45 may be provided with shanks 50 of alternate lengths to facilitate use of said cartridges in the trimming of different parts. Thus, a robot may be programmed to automatically select an exchangeable cartridge 45 having a shank length appropriate to the part being trimmed.

The shank 50 may include a slot 55 of some depth and length for receiving a portion of the trimming blade 40. A retention plate 60 or a similar cover may then be placed over the slot 55 to help retain the blade 40 therein. A blade retention element such as the spring-loaded pin 65 may then be passed through the retention plate 60 and/or shank 50 and through a corresponding hole in the blade 40 to retain the blade securely within the exchangeable cartridge 45.

As can be best observed in FIG. 4, an exchangeable cartridge retention mechanism 70 (shown in an unclamped position) is provided to releasably retain the exchangeable cartridge in the cartridge retention slot 100 of the cartridge retention assembly 95. The exchangeable cartridge retention mechanism 70 includes an actuator 75 mounted within a hollow interior of the main body portion 25. While the actuator 75 is shown to be a pneumatic cylinder in this particular embodiment, other actuators such as, for example, hydraulic cylinders, solenoids, and driven ball screw devices could also be used.

In this embodiment, a pivoting clamping element 80 is connected to the piston rod 85 of the pneumatic cylinder 75 and arranged such that when the piston rod is extended, the clamping element is caused to engage the shank 50 of the exchangeable cartridge 45. In this particular embodiment, the shank 50 includes a slot 90 into which a portion of the clamping element 80 enters when the piston rod 85 is extended. Upon entering the slot 90 in the shank 50, the clamping element 80 presses on the slot wall, thereby securely retaining the exchangeable cartridge 45 in the cartridge retention slot 95. In another exemplary embodiment of a cartridge retention mechanism, the slot in the shank may be absent, and the clamping element may simply exert a pressing force against the shank that is sufficient to retain the exchangeable cartridge in the cartridge retention slot. Other exchangeable cartridge retention mechanism designs may also be employed, and the present invention is not limited to those exemplary embodiments shown or described in detail herein.

Preferably, but not necessarily, operation of the actuator 75 and, thus, the cartridge retention mechanism 70, is controlled by the robot to which the end effector 20 is attached. Alternatively, operation of the cartridge retention mechanism 70 may be controlled by another control device, such as a programmable logic controller (PLC). Operation of the cartridge retention mechanism 70 and various other elements of the exchangeable cartridge 45 will be discussed in more detail below.

A torch (burner) 105 also extends from near the second end 25b of the main body portion 25 of the end effector 20. As shown, the burner 105 extends from the main body portion 25 at an angle to the trimming device 35. In this particular embodiment, the burner 105 is oriented at an angle of approximately 45° to the trimming device 35. The angle between the burner and the trimming device may vary from the 45° angle shown in other embodiments of an end effector of the present invention.

The exemplary burner 105 depicted in FIGS. 3-4 includes a burner head 110 that surrounds a nozzle 115. One or more fuel supply lines (not shown) may be routed to the burner 105. These fuel supply lines may be routed through the main body portion 25, or may run external thereto. Such a burner 105 would be well known to one of skill in the art and, therefore, further details of such a burner need not be described herein.

A flame F of some length and shape is emitted from the nozzle 115 when the end effector 20 is used in a flame treatment operation (see FIG. 5). As described above, the flame F may be directed against a bumper fascia or other molded part to effectuate the surface treatment of portions thereof.

Referring now to FIG. 5, the end effector 20 can be observed in an installed position on the end of a robot arm R. The robot arm R to which the end effector 20 is attached may be of various design such as, but not limited to, the six-axis robot arm depicted. As would be understood by one of skill in the art, attachment of the end effector 20 to a robot arm R like that shown in FIG. 5 allows for maximum freedom of movement of the end effector.

It can also be understood by reference to FIG. 5, that the divergence of the burner 105 from the trimming device 35 allows for a single end effector 20 to perform both a trimming and flame treatment operation. That is, the location and plane of operation of the trimming blade 40 is sufficiently removed from the location and plane of operation of the burner 105, such that the burner will not interfere with a trimming operation, and vice versa.

When processing of a molded part is required, the end effector 20 is moved by the robot arm R until the trimming blade 40 is properly oriented and in proper contact with a gate or flash to be trimmed. At this point, the burner 105 is preferably turned off. Once the trimming operation is complete, the burner 105 is ignited in preparation for a subsequent flame treatment process. In certain embodiments, burner ignition may entail moving the burner 105 to a position near a burner igniter, activating a fuel supply to the burner, and actuating the igniter to light the burner. In this case, the burner igniter is located remotely from the burner, such as on a wall or fence portion of a robot cell. Alternatively, an igniter may be located on the end effector 20, such that burner ignition may be initiated without the need to move the end effector to a remote burner ignition location. In any event, it is preferred but not essential, that the igniter is controlled by the robot R.

With the burner 105 ignited, the end effector 20 is reoriented by the robot R such that the burner is properly positioned for flame treatment of the desired molded part area. The robot then guides the end effector 20 along the trimmed an/o flash containing area(s) of the molded part such that the flame F emitted by the burner 105 contacts and treats the molded part.

As briefly described above in regard to the trimming device 35 and its exchangeable cartridge 45, an end effector of the present invention may be used in conjunction with a trimming blade changing station. One exemplary embodiment of such a trimming blade changing station 120 (blade changing station) is illustrated in FIGS. 6a-6b. As can be observed, this particular embodiment of the blade changing station 120 includes a blade exchange enclosure 125 supported on a base 130 by an upright post 135. Obviously, the depicted construction is for purposes of illustration only, and a blade changing station of the present invention may be of a design dissimilar to that shown. For example, the blade exchange enclosure 125 may be used without the base 130 or an upright post 135, or all of the blade exchange enclosure, base and upright post may be absent.

The blade exchange enclosure 125 of this exemplary blade changing station 120 is shown to include a plurality (in this case four) of exchangeable cartridge receivers 140, with access thereto through corresponding apertures 150 in a top wall of the blade exchange enclosure. The first three exchangeable cartridge receivers 140 are each shown to have an exchangeable cartridge 45 docked therein, while the last of the exchangeable cartridge receivers is shown to be empty. As shown, the first of the exchangeable cartridges 45 has a shank of longer length than the other exchangeable cartridges.

Each of the exchangeable cartridge receivers is essentially comprised of a boxlike structure having a hollow interior that forms a pocket for receiving the second end 50b of an exchangeable cartridge shank 50. A slot is located in the bottom of this pocket for allowing passage therethrough of the trimming blade 40. As can be seen most clearly in FIG. 6b, each exchangeable cartridge receiver also includes a recess for receiving a blade retention element (e.g., the spring-loaded pin 65) of a respective exchangeable cartridge 45.

The blade changing station may also include a plurality of exchangeable cartridge detectors 145, such as the exemplary proximity switch shown (only one of which is shown for reasons of clarity). For example, each exchangeable cartridge receiver 140 may be equipped with an exchangeable cartridge detector 145. The use of an exchangeable cartridge detector 145 allows the robot R to know which exchangeable cartridge receivers are empty, and which already contain an exchangeable cartridge 45. Exchangeable cartridges 45 having shanks 50 of various length (as described above) may be simultaneously stored in the blade changing station 120, and automatically selected by the robot R as needed to trim a given part.

The use of the blade changing station 120 allows for the simple, safe and efficient exchange of a dull or broken trimming blade 40. More specifically, when a trimming blade 40 becomes dull or broken during a molded part processing operation, the robot R may move to the blade changing station 120 to pick up another exchangeable cartridge 45 that contains a good trimming blade 40.

During a blade change process, the robot R examines signals from the exchangeable cartridge detector(s) 145 to determine into which exchangeable cartridge receiver(s) 140 it may deposit the exchangeable cartridge 45 currently in use. Once an exchangeable cartridge receiver 140 is selected, the robot R moves into a position over the blade exchange enclosure 125 of the blade changing station 120, and deposits the exchangeable cartridge 45 into the exchangeable cartridge receiver as depicted in FIG. 6b.

Once the exchangeable cartridge 45 has been properly positioned in the selected exchangeable cartridge receiver 140, the clamping mechanism 70 is signaled to release the exchangeable cartridge. The robot R may then retract from the blade changing station 120, while the exchangeable cartridge 45 it delivered remains in the selected exchangeable cartridge receiver 140. The robot subsequently moves to the location of an exchangeable cartridge receiver 140 that contains an exchangeable cartridge 45 with a good trimming blade 40. The cartridge drop-off procedure is then reversed, with the robot moving to a position wherein the shank 50 of the selected exchangeable cartridge 45 is received in the cartridge retention slot 100 of the cartridge retention assembly 95. The clamping mechanism 70 is then signaled to clamp the exchangeable cartridge 45, and the robot R thereafter retracts from the blade changing station 120 armed with a new exchangeable cartridge having good trimming blade 40.

Ideally, the changing of dull or broken trimming blades 40 is accomplished by an operator while the robot R is processing a molded part. To that end, it is preferred, but not essential, that the blade changing station 120 be located outside the normal work envelope of the robot R. Appropriate guarding may of course be used to ensure that the robot R cannot enter the area occupied by an operator during a blade changing operation.

The changing of a dull or broken trimming blade 40 may be quickly and easily accomplished by an operator. Particularly, with an exchangeable cartridge 45 located in an exchangeable cartridge receiver 140, as is best illustrated in FIG. 6b, a broken or dull trimming blade 40 may be removed by simply retracting the spring-loaded pin 65 so that the trimming blade is released and may be withdrawn by the operator from the exchangeable cartridge. A new trimming blade 40 may be reinstalled to the exchangeable cartridge 45 in a reverse manner.

In one exemplary embodiment of the present invention, the robot R returns to a "home" position after selecting a new exchangeable cartridge 45. In this "home" position, the trimming blade 40 of the exchangeable cartridge 45 is positioned so as to activate a fixed detector, such as a proximity switch. Consequently, homing of the robot R and the use of such a detector can be used to detect a broken or missing trimming blade 40. If the robot R determines that a selected exchangeable cartridge 45 has a missing or broken trimming blade 40 in this manner, the robot simply returns the exchangeable cartridge to the blade changing station 120 and selects another. This process may be repeated until an exchangeable cartridge 45 with a good blade is selected. In an alternate embodiment of the present invention, additional sensors (not shown) may be associated with the blade changing station 120 and used to detect broken or missing trimming blades 40 in the docked exchangeable cartridges 45. Signals from such sensors may be transmitted to the robot R such that the robot can determine what exchangeable cartridge(s) 45 can be selected.

From the foregoing description of exemplary embodiments, it can be understood that an end effector of the present invention greatly improves the efficiency of a combination trimming/flame treatment process. Overall process efficiency and safety can also be improved through use of an optional blade changing station as discussed above. Although the use of an end effector and blade changing station of the present invention are described above primarily with respect to processing a bumper fascia, it should be apparent to one of skill in the art that an end effector of the present invention may also be used to process other molded parts requiring trimming and/or flame treatment. Similarly, a blade changing station of the present invention may be used in conjunction with robotic trimming systems and processes associated with molded parts other than bumper fascias. It is also possible for an end effector and/or blade changing station to be used in a process associated with articles other than molded parts.

It should also be realized by one of skill in the art that the exemplary embodiments of the present invention described in detail above are provided solely for the purpose of illustration, and not limitation. Consequently, the scope of the present invention is not to be considered limited by the disclosure of such exemplary embodiments, and modifications thereto are possible without departing from the spirit of the invention as evidenced by the following claims:

What is claimed is:

1. A combination robot end effector, comprising:
   a main body portion having a first end adapted for attachment to an end of a robot arm;
   a trimming device comprising a slicing blade releasably affixed to said main body portion so as to extend from a second end thereof, said trimming device releasably affixed to said main body portion via a cartridge retention assembly that includes an actuator located within the main body portion;
   a burner affixed to and extending from near said second end of said main body portion, said burner extending from said main body portion at a diverging angle to said trimming device;
   wherein said trimming device and said burner can be selectively used to respectively trim and flame treat an article of interest.

2. The end effector of claim 1, further comprising a mounting plate for attaching said first end of said main body portion to the end of the robot arm.

3. The end effector of claim 1, wherein said main body portion has a substantially hollow interior.

4. The end effector of claim 1, wherein said slicing blade is retained in an exchangeable cartridge.

5. The end effector of claim 4, wherein said cartridge retention assembly includes a cartridge retention slot for receiving a shank of said exchangeable cartridge.

6. The end effector of claim 5, further comprising a cartridge retention mechanism for retaining the exchangeable cartridge in said cartridge retention slot, said cartridge retention mechanism including a clamping element driven by the actuator into retaining contact with said shank of said exchangeable cartridge.

7. The end effector of claim 6, further comprising a slot in said shank of said exchangeable cartridge, said slot in said shank for receiving said clamping element when said cartridge retention mechanism is in a clamped position.

8. The end effector of claim 4, further comprising a blade retention element for retaining said slicing blade in said exchangeable cartridge.

9. The end effector of claim 8, wherein said blade retention element is a spring-loaded pin that extends through a corresponding hole in said slicing blade.

10. The end effector of claim 1, wherein said burner includes a head portion that extends from said main body portion, said head portion enclosing a nozzle from which a flame is emitted.

11. The end effector of claim 1, wherein said burner extends from said main body portion at an angle of approximately 45° to said trimming device.

12. A combination trimming and flame treatment robot end effector, comprising:
   a substantially hollow main body portion having a first end adapted for attachment to an end of a robot arm;
   a cartridge retention assembly associated with said main body portion;
   a trimming device comprising a trimming blade mounted within an exchangeable cartridge, said exchangeable cartridge having a shank that is releasably received within a cartridge retention slot of said cartridge retention assembly, said trimming device oriented such that said trimming blade extends from a second end of said main body portion;
   an cartridge retention mechanism located within said main body portion for exchangeably retaining said exchangeable cartridge in said cartridge retention slot, said cartridge retention mechanism including a clamping element driven by a powered actuator into retaining contact with said shank of said exchangeable cartridge, said powered actuator being secured to the main body portion;

a burner affixed to and extending from near said second end of said main body portion, said burner extending from said main body portion at a diverging angle to said trimming device;

wherein said trimming device and said burner can be selectively used to respectively trim and flame treat an article of interest.

13. The end effector of claim 12, further comprising a slot in said shank of said exchangeable cartridge, said slot in said shank for receiving said clamping element when said cartridge retention mechanism is in a clamped position.

14. The end effector of claim 12, further comprising a trimming blade retention element for retaining said trimming blade in said exchangeable cartridge.

15. The end effector of claim 14, wherein said trimming blade retention element is a spring-loaded pin that extends through a corresponding hole in said trimming blade.

16. The end effector of claim 12, wherein said burner extends from said main body portion at an angle of approximately 45° to said trimming device.

17. A robot end effector, comprising:
a body securable to a robot arm and shaped to receive a portion of a trimming device, the trimming device including an exchangeable cartridge having a shank and being selectively operable to trim an article of interest when the trimming device is secured to the body;

a burner secured to the body, the burner selectively operable to flame treat the article of interest;

a cartridge retention assembly secured to the body and having a cartridge retention slot adapted to receive the shank of the trimming device; and a retention mechanism associated with the body and comprising:
  a pivoting clamping element moveable between a clamped position where a first end of the clamping element is in pressing contact with the shank of the trimming device while the shank resides in the cartridge retention slot to secure the trimming device to the body, and an unclamped position where the first end of the clamping element is rotated away from the shank so as to release the trimming device from the body, and
  an actuator secured to the body and coupled to a second end of the clamping element, the actuator selectively operable to pivot the clamping element between the clamped position and the unclamped position.

18. The robot end effector of claim 17, wherein said trimming device includes a trimming blade that is retained in said exchangeable cartridge.

19. The robot end effector of claim 17, wherein said retention mechanism is located in a space within said body.

20. The robot end effector of claim 17, further comprising a slot in said shank of said exchangeable cartridge, said slot located and adapted such that the pressing contact between said clamping element and said shank will occur against a wall of said slot.

* * * * *